Figure 1:
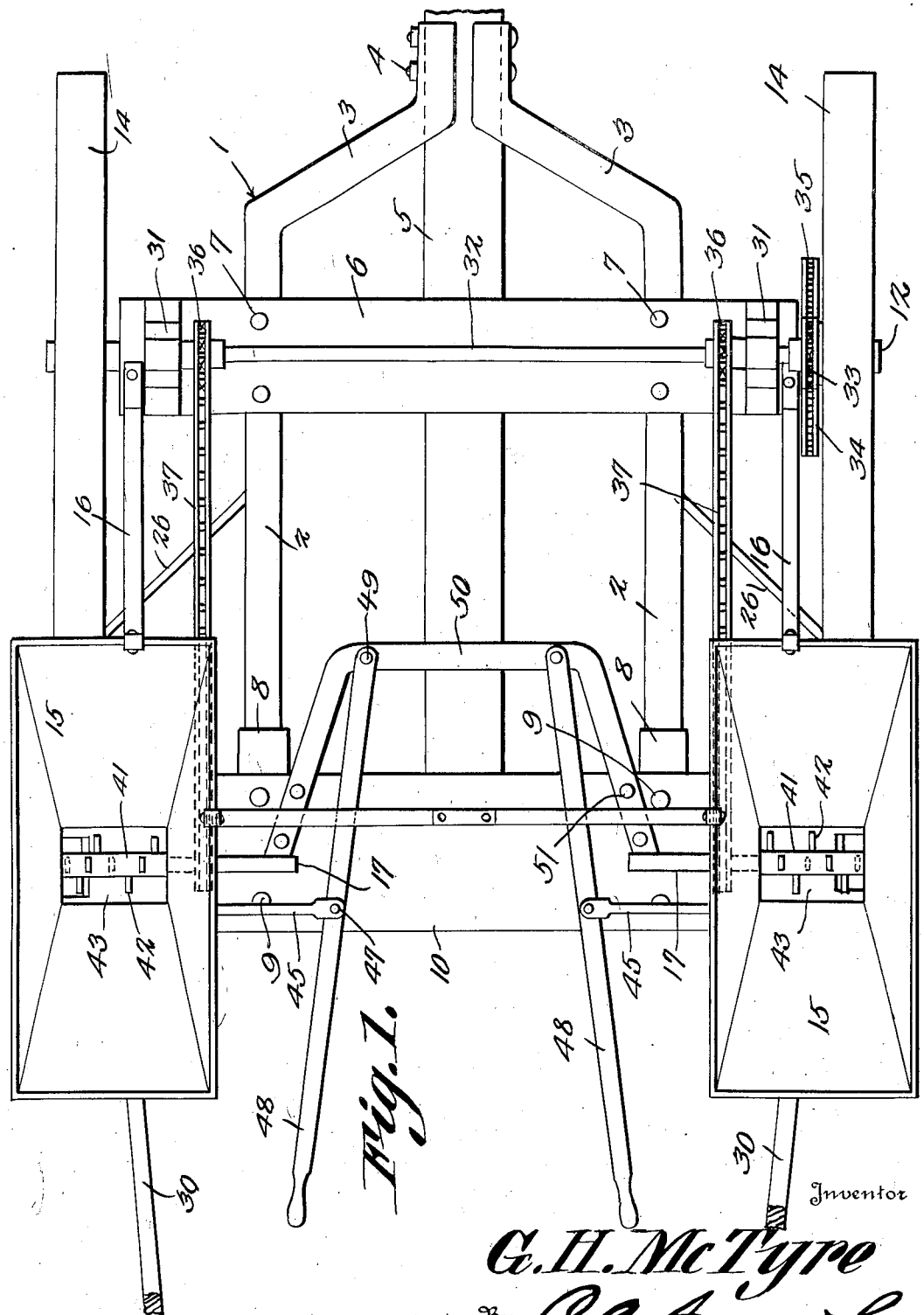

May 10, 1927.

G. H. McTYRE 1,627,798

FERTILIZER DISTRIBUTOR

Filed April 11, 1924

3 Sheets-Sheet 2

Inventor
G. H. McTyre
By C. A. Snow & Co.
Attorneys

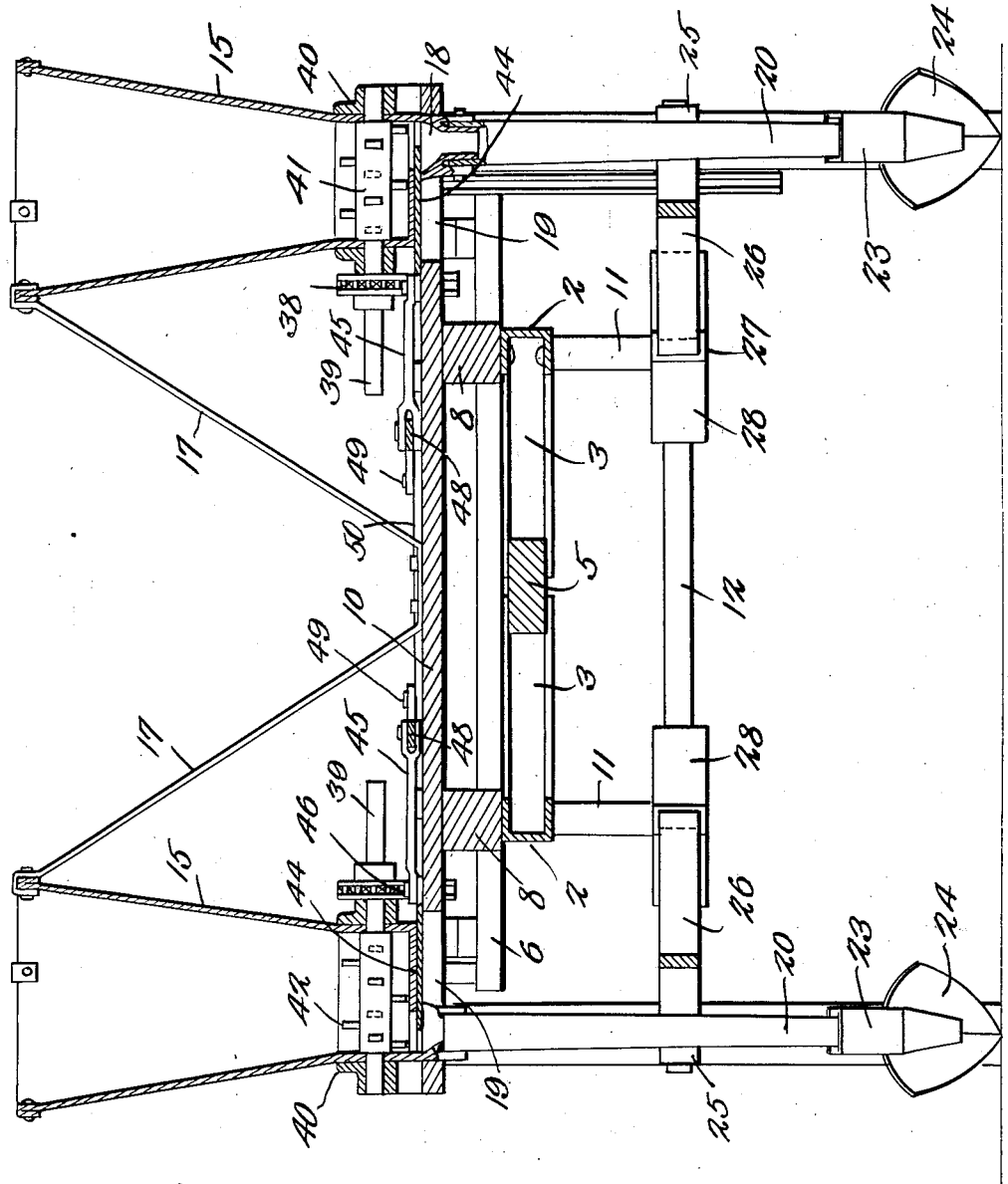

Patented May 10, 1927.

1,627,798

UNITED STATES PATENT OFFICE.

GEORGE H. McTYRE, OF DAINGERFIELD, TEXAS.

FERTILIZER DISTRIBUTOR.

Application filed April 11, 1924. Serial No. 705,908.

This invention aims to provide a two-row commercial fertilizer distributor which is so constructed that it will cover a large acreage in a short time, the device being so constructed that it will not clog, and the ground being opened for the reception of the fertilizer.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown, can be made, without departing from the spirit of the invention.

In the accompanying drawings:—

Figure 1 shows a top plan, a device constructed in accordance with the invention; Figure 2 is a side elevation; and Figure 3 is a transverse section.

In carrying out the invention there is provided a frame 1, including side bars 2 having converging forward ends 3 connected at 4 to a tongue 5. A forward cross bar 6 is secured at 7 to the tongue 5. Blocks 8 are secured to the rear ends of the side bars 2 and are attached thereto by bolts or the like, shown at 9, the bolts serving to retain a rear cross bar 10 which is to be superposed on the blocks 8. The forward cross bar 6 carries depending hangers 11 supporting an axle 12 whereon ground wheels 14 are journaled.

Hoppers 15 are mounted on the rear cross bar 10. The hoppers 15 are sustained from the forward cross bars 6 by braces 16. The hoppers 15 are also sustained from rear cross bar 10 by braces 17. The hoppers 15 have spouts 18 projecting through openings 19 in the rear cross bar 10. Chutes 20 are attached as at 21 to ears 22 on the spouts. The chutes 20 are equipped at their lower ends with discharge heads 23 located behind furrow openers 24 secured by clamps 25, or otherwise, to inwardly extended beams 26, united by sockets 27, or otherwise, to sleeves 28 which are mounted on the axle 12. The heads 23 of the chutes 20 are connected at 29 to the standard portions of the openers 29. Adjustable handles 30 of any desired sort are carried by the rear ends of the beams 26.

Bearings 31 are mounted on the forward cross bar 6. In the bearings 31, a shaft 32 is journaled for rotation. The shaft 32 is provided with a sprocket wheel 33 about which is engaged a sprocket chain 34 cooperating with a sprocket wheel 35 which is connected to one of the ground wheels 14 to rotate therewith. The shaft 32 carries sprocket wheels 36 about which are engaged sprocket chains 37 cooperating with sprocket wheels 38 carried by shafts 39 journaled in bearings 40 carried by the rear cross bar 10 and located on both sides of each of the hoppers 15. The shafts 39 are provided with agitators 41 which are rotatable in the lower ends of the hoppers 15, the agitators having radial fingers 42.

Gates 43 are mounted slidably on the rear cross bar 10 beneath the bottoms 44 of the hoppers 15. Links 45 are pivoted at their inner ends, as at 46, to the gates, and are pivoted to their outer ends, as at 47, to rearwardly extended levers 48, the forward ends of the levers 48 being fulcrumed as at 49, upon a U-shaped bracket 50, projecting forwardly from the rear cross bar 10 and secured thereto as shown at 51.

In practical operation, one of the ground wheels 14 will impart rotation to the sprocket wheel 35, the said sprocket wheel rotating the shaft 32 by way of the sprocket chain 34 and the sprocket wheel 33. When the shaft 32 is rotated, the sprocket wheels 36 drive the sprocket chains 37, the chains imparting rotation to the shafts 39, and the agitators 41 being caused to rotate within the hoppers 15 at the lower ends thereof. Through the instrumentality of the levers 48 and the links 45, the gates 43 may be slid inwardly and outwardly, thereby regulating the amount of fertilizer which passes from the hoppers 51, downwardly through the sprouts 18, into the chutes 20, and from thence through the discharge heads 23 into or upon the ground, behind the furrow openers 24.

The device is simple in construction and will be found very efficient for the ends in view. Although a specific form of cultivator frame has been described, it will be understood that the device is capable of use on cultivators of widely different sorts.

Having thus described the invention, what is claimed is:—

A fertilizer distributor embodying a ground wheel, a frame supported thereby, handles mounted on the frame and extended rearwardly with respect to the frame, hoppers carried by the frame, gates slidable on the frame and governing the flow from the hoppers, means for conveying the contents of the hoppers to the places of application, a bracket carried by the frame and located between the hoppers, the bracket extending forwardly from the rear portion of the frame, levers located between the hoppers and prolonged rearwardly beneath the handles, the levers being fulcrumed at their forward ends on the intermediate portion of the bracket for horizontal swinging movement, outwardly extended links pivoted at their inner ends directly to the levers, and means for connecting the outer ends of the links directly and pivotally to the gates.

In testimony that I claim the foregoing as my own, I have hereto affixed my signature.

GEORGE H. McTYRE.